United States Patent [19]
Desai et al.

[11] Patent Number: 5,765,008
[45] Date of Patent: Jun. 9, 1998

[54] PERSONAL COMPUTER WITH RISER CARD PCI AND MICRO CHANNEL INTERFACE

[75] Inventors: Dhruv M. Desai, Boynton Beach; Bruce A. Smith, Jupiter; Robert Wolford, Delray Beach, all of Fla.; Akitoshi Katoh, Kanagawa, Japan

[73] Assignee: International Business Machines Corporation, Armond, N.Y.

[21] Appl. No.: 708,102

[22] Filed: Aug. 8, 1996

Related U.S. Application Data

[63] Continuation of Ser. No. 323,232, Oct. 14, 1994, abandoned.
[51] Int. Cl.$^6$ .................................................. G06F 13/00
[52] U.S. Cl. ................ 395/800; 395/281; 370/85.13; 364/231; 364/238.2; 364/240.2; 364/DIG. 1
[58] Field of Search ................ 395/200.01, 200.15, 395/200.18, 200.2, 281, 284, 306–309, 490, 180, 800; 380/3, 4; 370/85.1, 85.9, 85.13

[56] References Cited

U.S. PATENT DOCUMENTS

| | | |
|---|---|---|
| 5,392,407 | 2/1995 | Heil et al. ........................... 395/293 |
| 5,440,775 | 8/1995 | Harwer et al. ........................ 395/800 |
| 5,446,869 | 8/1995 | Padgett et al. ........................ 395/500 |
| 5,533,204 | 7/1996 | Tipley ................................... 395/288 |
| 5,581,714 | 12/1996 | Amini et al. ........................ 395/308 |
| 5,611,057 | 3/1997 | Pecone et al. ....................... 395/282 |

OTHER PUBLICATIONS

Compustar User's Manual, Aug. 1988.

*Primary Examiner*—Alpesh M. Shah
*Attorney, Agent, or Firm*—Bernard D. Bogdon

[57] ABSTRACT

A computer having a riser card with a riser card interface that connects to an industry standard system board and has slots for expansion cards is provided with support circuitry that enables the computer system to perform personalized functions not provided for by the industry standard system board, including security functions. The placing of the support circuitry on the riser card allows the use of an industry standard system board and the personalization of the system to perform different IBM PS/2 functions depending on the installed riser card, in conjunction with Micro Channel and PCI bus architecture.

4 Claims, 7 Drawing Sheets

PERSONAL COMPUTER WITH RISER CARD PCI AND MICRO CHANNEL INTERFACE

The application is a, continuation, of application Ser. No. 08/323,232 filed on Oct. 14, 1994, now abandoned.

BACKGROUND OF THE INVENTION

1. Field of the Invention

The present invention relates to system boards for a computer, and in particular, to riser cards that connect to the system board and accept adapters that are plugged into the riser card instead of the system board.

2. Description of Related Art

The system board (or "motherboard") of a computer is a large printed circuit board that holds the silicon chips that provide the functionality of the personal computer (PC). These chips can include the processor and the supporting chips that the processor needs to help it perform its tasks, such as the clock chip. The system board contains expansion slots into which adapters or other cards can be plugged.

One type of card which can be plugged in to the expansion slot of a system board is a riser card. Due to the large amount of functionality provided on the system board, there is less room for inserting expansion cards in the slots directly on the system board. To provide more room for expansion cards, a riser card is insertable into an expansion slot on the system board. This riser card has a plurality of further expansion slots, such as five or eight expansion slots. This provides more room on the system board and thereby allows more functions to be resident on the system board as standard functions. The use of riser cards is well-known in the computing industry.

It is desirable to reduce development expense by utilizing system boards that are as close to industry standard as possible. However, this goal conflicts with the further desirability of allowing for product differentiation. For example, there are several functions most often included in the well-known IBM PS/2 systems which are not included in the industry standard chip set designs.

There is therefore a need for a riser card interface and riser card componentry which allows for system personalization to support computing functions that are not supported by the industry standard system board. These needs should be met without substantially changing the configuration of the industry standard system board.

3. Summary of the Invention

These and other needs are met by the present invention which provides a computer comprising a system board having an Industry Standard Architecture (ISA) bus and a peripheral controller interface (PCI) connection, and logic circuitry that supports a first set of computing functions. The system board has at least one connector slot. A riser card is inserted in the system board connector slot, this riser card having connector slots for accepting expansion cards, and a riser card interface that communicates with the system board through the system board connector slot and with the expansion cards through the riser card connector slots. The riser card interface includes support circuitry mounted on the riser card that performs with the logic circuitry of the system board a second set of computing functions that is different from the first set of computing functions. The support circuitry includes a security chip coupled to the ISA bus, so that the second set of computing functions includes security functions.

Other embodiments of the invention include further functions provided by the support circuitry located on the riser card. These functions, along with the security functions, permit the computer to emulate a more specialized computer, such as an IBM PS/2 computer, even though the computer contains an industry standard system board.

The riser card used in the present invention provides more than a mere translation between different types of bus architectures. Rather, the support circuitry located on the riser card enables the specialized functions that are not located on the system board, and does so in a compact package that is easily changed by changing the riser card that is inserted into the connector slot of the system board.

Other types of computing functions can be provided in addition to, or instead of, PS/2 computing functions. This allows the use of an industry standard system board with different specific riser cards and riser card interfaces to provide for system personalization. The specific enhanced functions that are to be activated, or not, will be based upon the riser card that is plugged into the system board, and not on the system board itself.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 4b is a block diagram showing the address flow in the bridge chip of FIG. 4a.

DESCRIPTION OF THE ILLUSTRATIVE EMBODIMENTS

Figure 1:
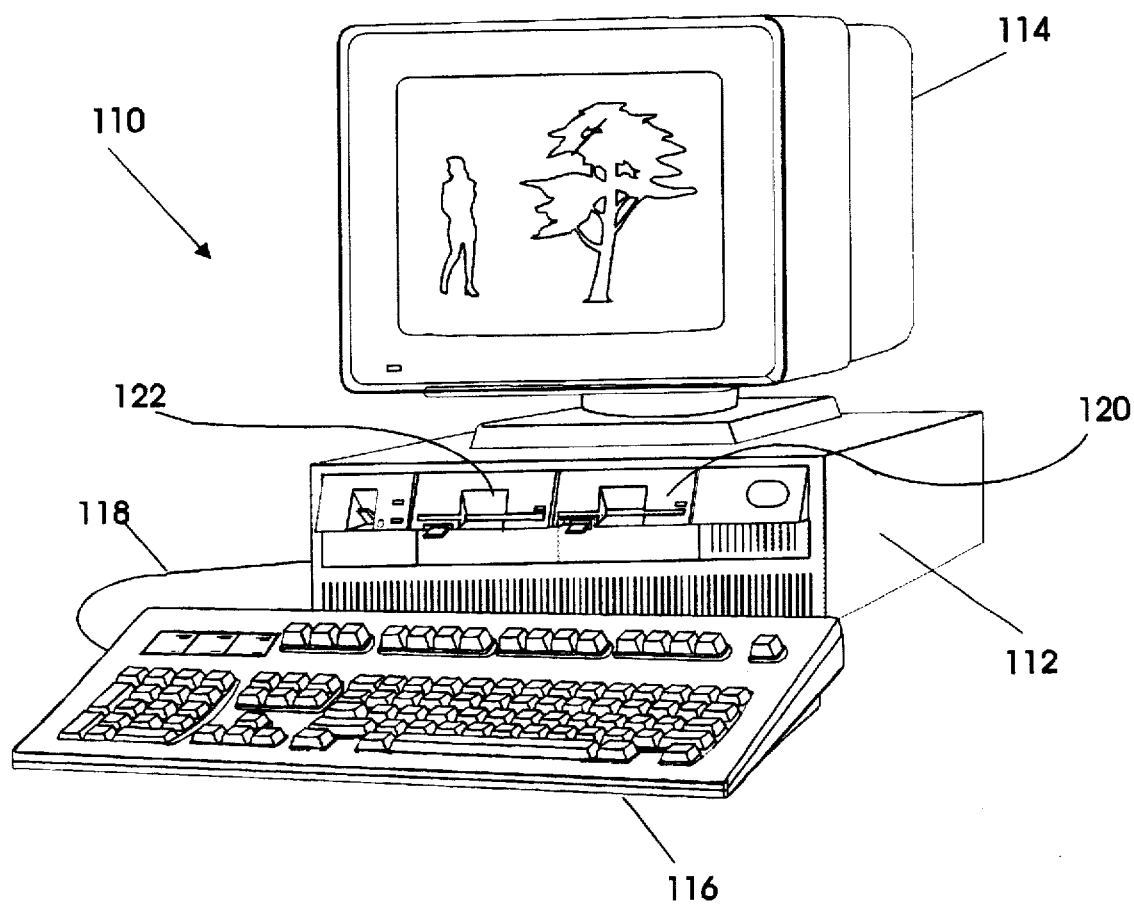
FIG. 1 illustrates a personal computer system of the present invention.

With reference now to the Figures, and in particular with reference to FIG. 1, a personal computer, or PC, designated 110 is of the environment to which the invention has particular utility. The computer 110 which preferably, but not necessarily, is of a type utilizing an IBM Personal Computer or similar system, includes a console housing 112 within which circuit boards containing the necessary circuitry including microprocessor and BIOS chips, controllers, random access memory and other hardware are arranged. The computer will also include a video display 114 and a keyboard 116 connected into the housing 112 through cable 118. Mass storage media include a hard drive within the housing and not accessible to the user, and user accessible floppy disks in slots 21 an 23 as well as, optionally, CD-ROM drives 120 and 122.

Figure 2:
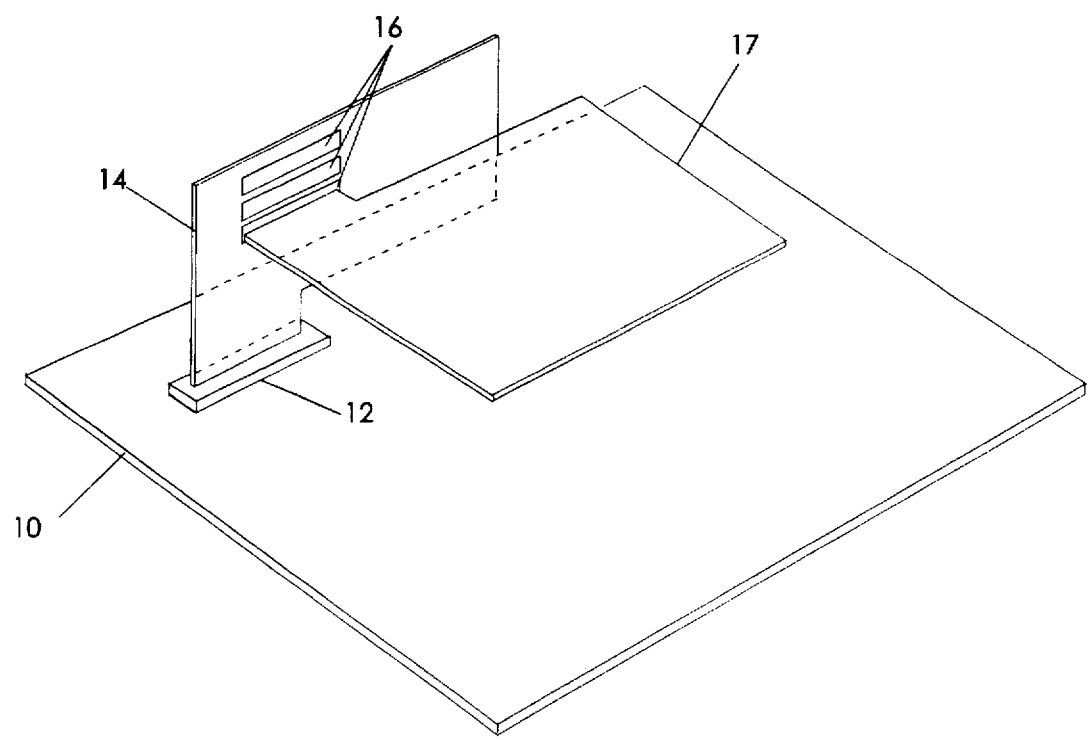
FIG. 2 illustrates a perspective view of a system board, a riser board and an adapter that are interconnected and provided in a computer system such as that shown in FIG. 1.

In the following description, the specific enhanced functions that are activated by the plugging in of the riser card are IBM PS/2 (a trademark of IBM Corporation) functions in conjunction with the well-known Micro Channel (a trademark of IBM Corporation) bus architecture. However, the present invention is not limited to the enablement of PS/2 functions, but rather, finds utility in emulating different types of computing functions using an industry standard system board and a different riser card containing alternative support circuitry FIG. 2 is a schematic view showing the interconnections between the system board 10, the riser card 14 and an adapter (or expansion) card 25 that are located within the console housing 112 of the computer system of FIG. 1. The system board 10 is an industry standard board that would not support traditional PS/2 features without requiring unique logic circuitry mounted on the system board 10. This logic circuitry, however, does not need to be mounted on the board 10 since the riser card of the present invention enables the system board 10 to emulate the PS/2 system by performing the PS/2 functions.

The system board 10 includes an expansion slot 12 into which the riser card 14 at connector 16 is inserted. The riser card 14 has a number of expansion slots 20 and 24 into which the expansion or adapter cards 25 are inserted. The riser card 14 can have any number of adapter slots 20 and 24. For illustration purposes, only a single expansion card 17 is shown inserted into a slot 20.

The support circuitry mounted on the riser card enables the system board 10 and the system to emulate a PS/2 computer system by performing the functions that are considered to be PS/2 functions. These functions include controlling the EEPROM, media sense support, interface with a non-volatile RAM, and tamper detection logic.

Figure 3:
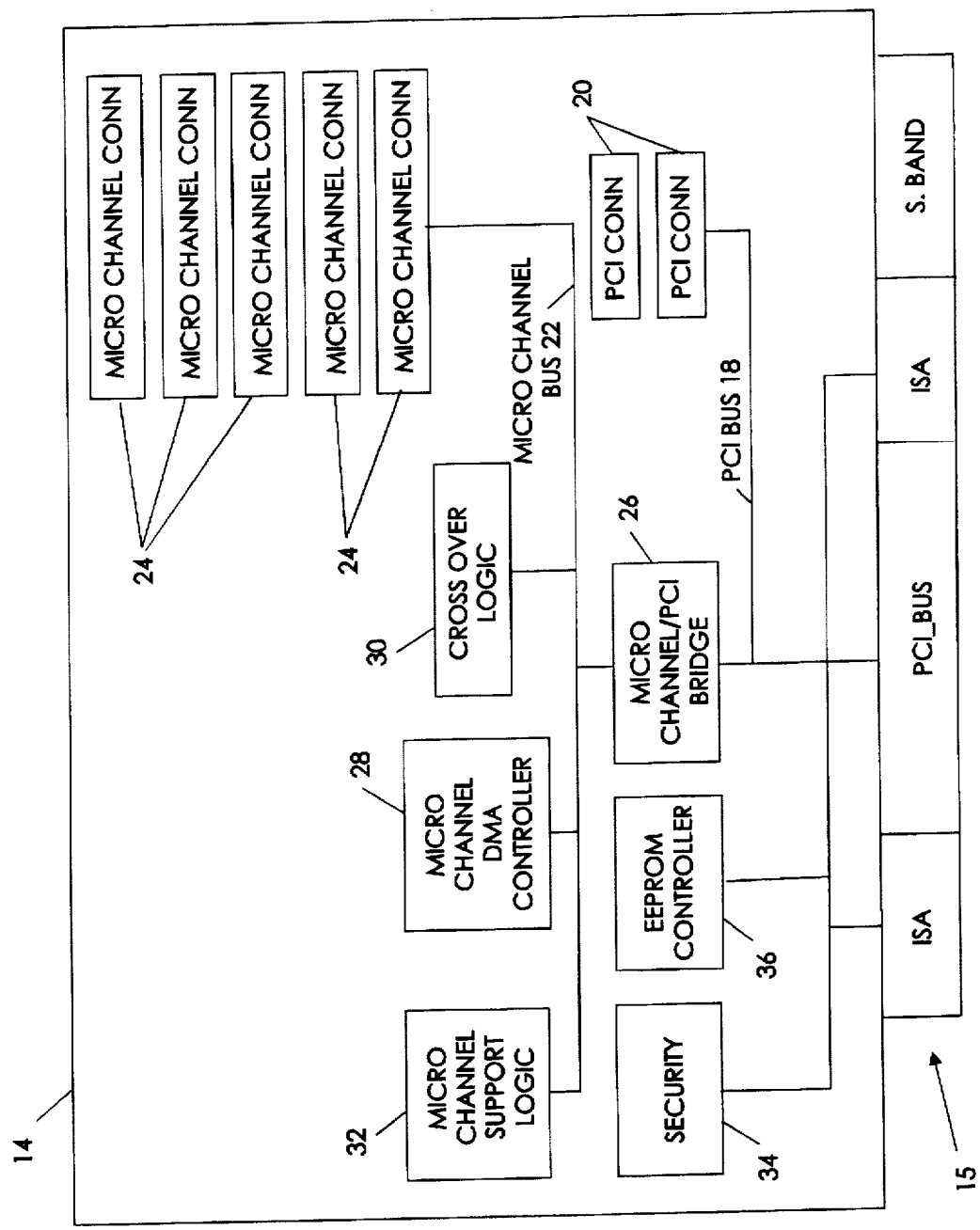
FIG. 3 is a block diagram of the riser card according to the principles of the present invention.

A block diagram of an exemplary embodiment of the riser card 14 is shown in FIG. 3. The riser card 14 includes a first connection that couples the riser card 14 to an industry standard architecture (ISA) bus and a PCI bus resident on the system board 10. The riser card 14 also has a PCI (peripheral controller interface) bus 18 between the connection 15 and extending to PCI card slots 20, which accept PCI expansion cards. Two PCI card slots 20 are illustrated in FIG. 3, although a different number of card slots can be provided.

The riser card 14 also has a Micro Channel bus 22 to support the Micro Channel architecture used with the PS/2 functions. Five Micro Channel card slots 24 are coupled to the Micro Channel bus 22 in the embodiment of FIG. 3. Other embodiments of the riser card 14 of the present invention provide different numbers of Micro Channel card slots 24, such as three card slots. In the exemplary embodiment of the invention, the system board 10 carries out the PS/2 functions using the Micro Channel bus 22 and the Micro Channel architecture. The system board 10 is coupled to the Micro Channel slots 24 and the Micro Channel bus 22 through the PCI bus 18. A conversion is necessary between the Micro Channel bus signals and the PCI bus signals. This conversion between the PCI bus signals and the Micro Channel bus signals is provided by a Micro Channel/peripheral controller interface (MC/PCI) bridge chip 26 coupled between the PCI bus 18 and the Micro Channel bus 22. An exemplary embodiment of this MC/PCI bridge chip 26 will be described later with respect to FIGS. 4a and 4b.

Other logic circuits that are coupled to the Micro Channel bus 22 to provide the support for the PS/2 functions are a Micro Channel direct memory access (DMA) controller chip 28, and a cross over logic chip 30. Both of these chips 28,and 30 are conventional, well-known chips that perform their customary functions. Since the MC/PCI bridge chip 26 is not conventional, the DMA controller chip 28 needs to be able to interface with this bridge chip 26. A Micro Channel support logic chip 32 provides this interfacing for the conventional DMA controller chip 28. The Micro Channel support logic chip 32 also supports the arbitration logic which works with the existing industry standard arbitration chip located on the system board 10. An exemplary embodiment of the Micro Channel support logic chip 32 is shown in more detail and described later with respect to FIG. 5.

The riser card 14 also includes a security chip 34 which supports the PS/2 functionality of tamper evidence protection and password security. The security chip 34 is illustrated in more detail and described later with respect to FIG. 6.

An electrically erasable programmable read only memory (EEPROM) controller 36 is also coupled to the ISA bus and is included on the riser card 14. The EEPROM controller 36 is conventional and controls the EEPROM located on the system board 10.

Figure 4A:
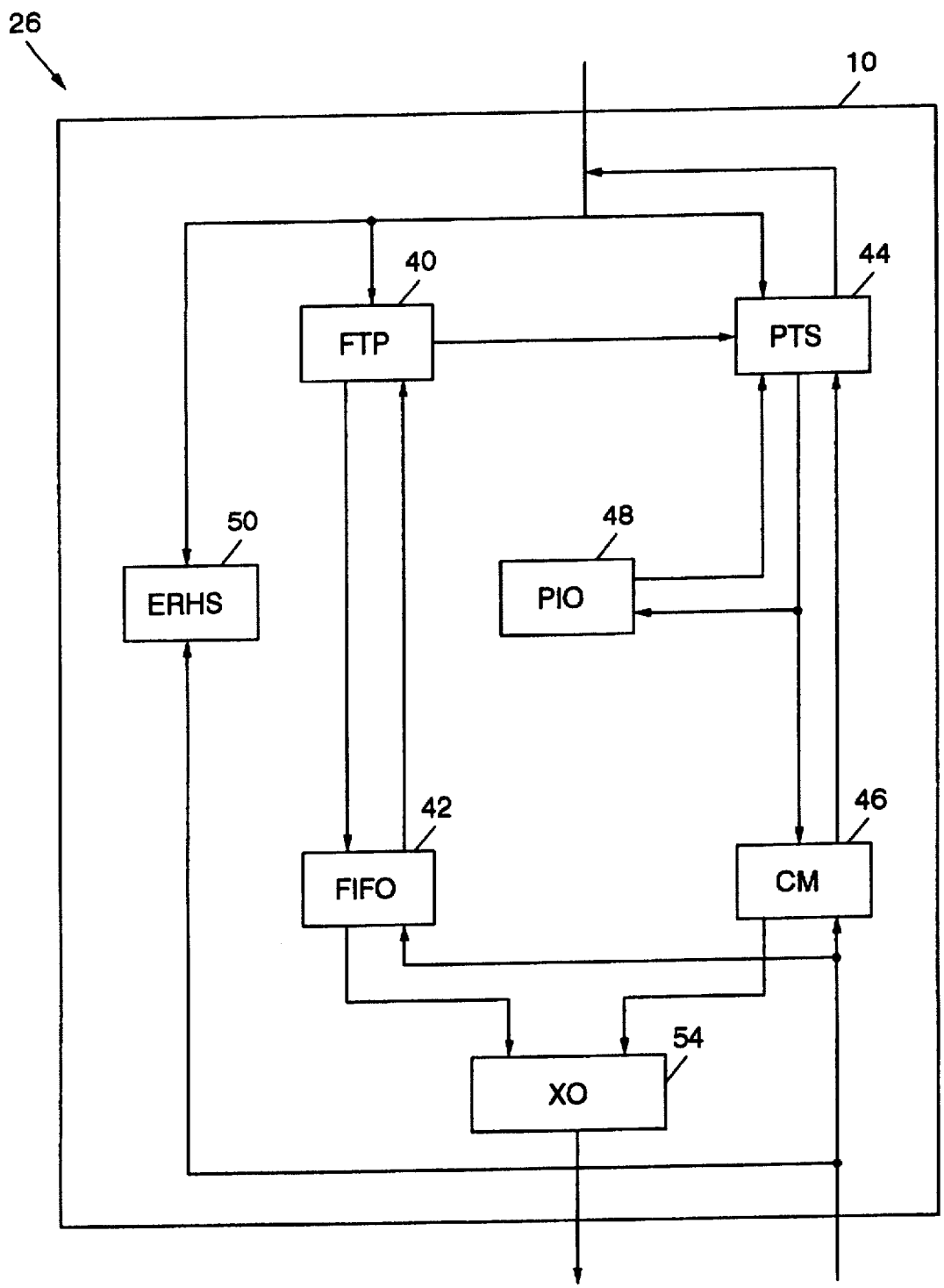
FIG. 4a is a block diagram showing the data flow in a bridge chip constructed in accordance with an embodiment of the present invention used in the riser card of FIG. 3.
Figure 4B:
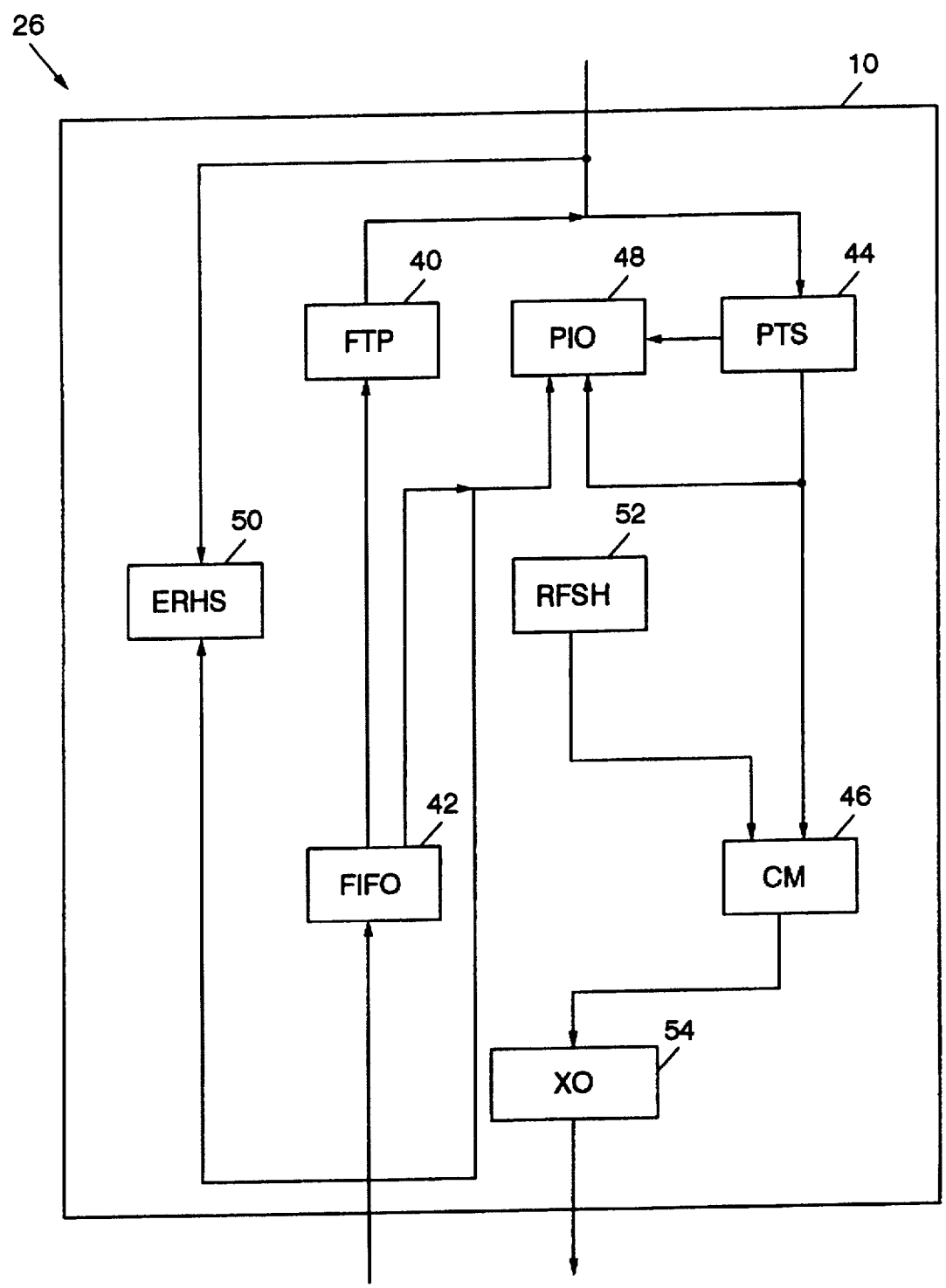

FIGS. 4a and 4b illustrate in more detail in block diagram form the Micro Channel/PCI bridge chip 26 used in the riser card of FIG. 3. FIG. 4a shows the connectivity and the data flow of the bridge chip, while FIG. 4b illustrates the address flow in the bridge chip 26. The functionality of the individual blocks within these figures will be described, with the flow of data and address being self-explanatory from the Figures.

Block 40 is a FIFO control to the PCI bus, and handles Micro Channel cycles originated by the Micro Channel master and interfaces with a FIFO block 42. The FIFO control 40 also interfaces to the PCI bus 18 as a master.

Block 44 is a PCI to internal bus that interfaces to the PCI bus 18 as a slave and directs PCI cycles toward the Micro Channel bus 22 or towards internal registers.

A Micro Channel master interface 46 generates Micro Channel cycles. On the Micro Channel bus 22, the Micro Channel master interface 46 serves as a master, and also generates refresh cycles when it is requested by a refresh circuit.

Block 48 controls the access to the internal registers of the bridge chip 26.

Error handling and reporting support is provided by block 50. The control and reporting error condition is performed during Micro Channel and PCI bus cycles.

Referring to FIG. 4b, block 52 supports refresh bus cycle timing and requests the bus when required.

Block 54 controls the multiplexing of the address and data during Micro Channel streaming cycles and control data cycles.

Each of the individual blocks described above are readily produced and combinable by one of ordinary skill in the art.

Figure 5:
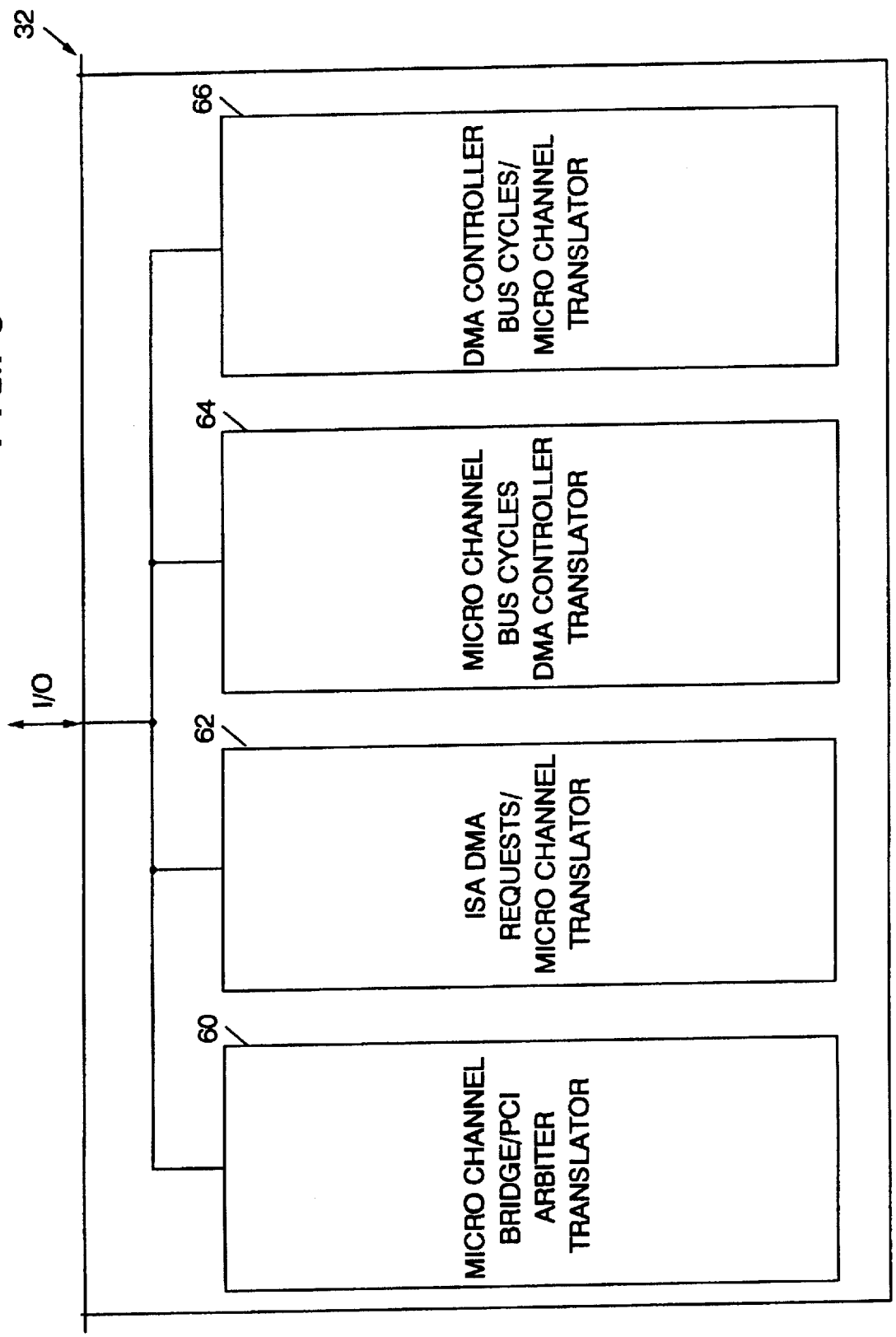
FIG. 5 is a block diagram of support logic constructed in accordance with the present invention for use on the riser card of FIG. 3.

A basic block diagram of the Micro Channel support logic 32 used in the riser card 14 of FIG. 3 is illustrated in more detail in FIG. 5. The Micro Channel support logic block 32 has a first translator 60 which translates Micro Channel bridge requests into a format that is expected by the PCI arbiter. A second translator 62 translates the ISA direct memory access requests into the Micro Channel format. A third translator 64 translates the Micro Channel bus cycles into the direct memory access controller format. A fourth translator 66 translates the direct memory access controller bus cycles into the Micro Channel format. Each of the translators 60, 62, 64 and 66 is readily producible by one of ordinary skill in the art. The Micro Channel support logic chip 32 is coupled to the Micro Channel bus 22 of the riser card 14. For explanatory purposes, a single input/output line to the Micro Channel bus 22 has been illustrated, although there are a plurality of connections between the support logic chip 32 and the Micro Channel bus 22.

Figure 6:
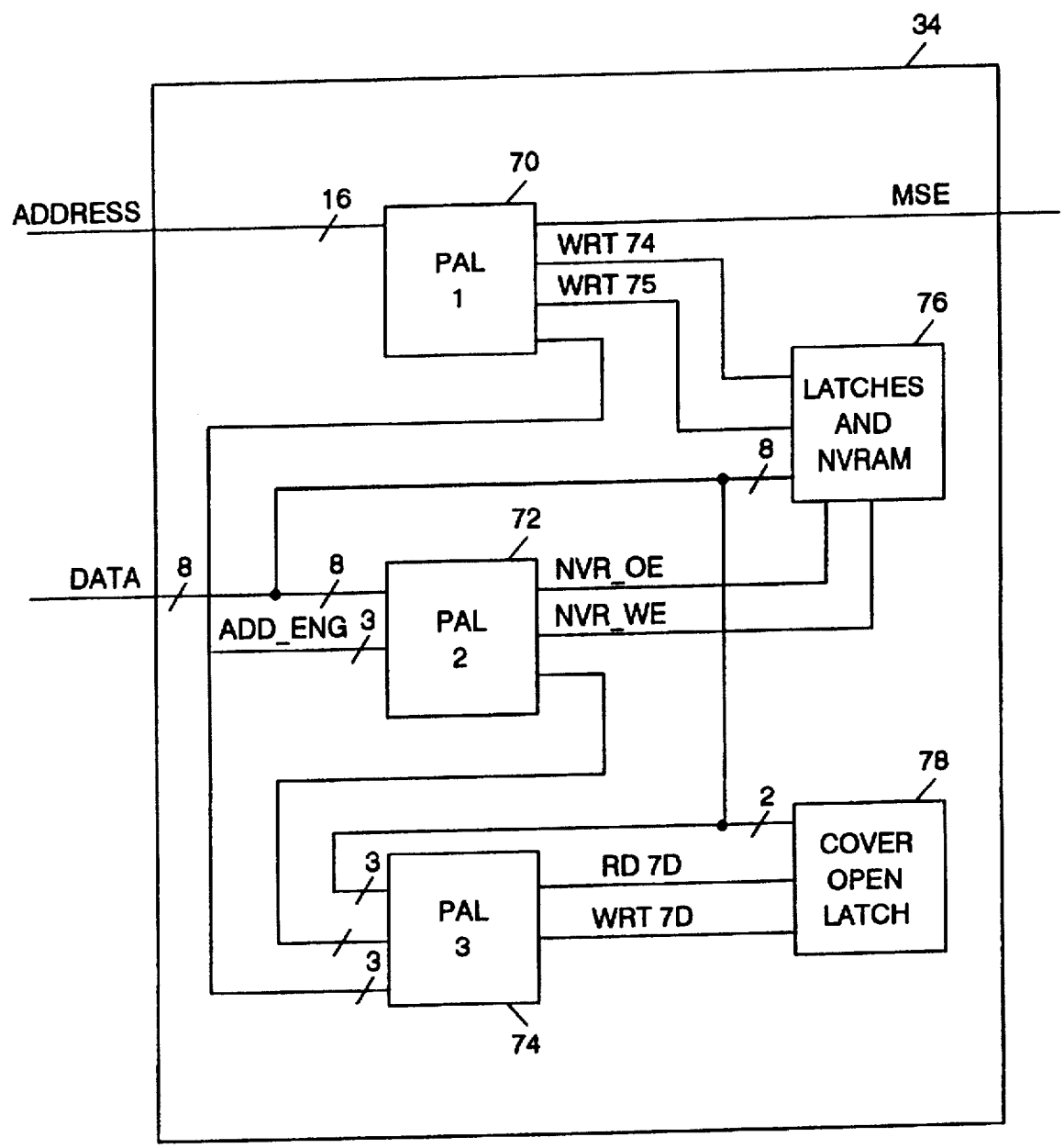
FIG. 6 is a block diagram of an exemplary embodiment of a security chip constructed in accordance with an embodiment of the present invention for use on the riser card of FIG. 3.

The security chip 34 used in the riser card 14 of FIG. 3 is illustrated in more detail in the block diagram of FIG. 6. The security chip 34 includes three programmable array logic (PAL) circuits 70, 72 and 74. It also includes latches and a non-volatile RAM (NVRAM) 76, as well as a latch 78 which indicates when the cover of the computer is open.

The first programmable array logic circuit 70 provides the address decoding for the NVRAM 76. It also provides a media sense enable function.

The second programmable array logic circuit 72 provides read and write abilities, protects the power-on password, and provides the privileged access protection control flags.

The third programmable array logic circuit 74 provides the tamper evidence detection (such as when the latch 78 detects the cover of the computer being opened), and also provides read/write control.

The programmable array logic circuits are readily programmed by one of ordinary skill in the art to provide the above functionality.

The riser card 14 with the security chip 34 provides for a number of PS/2 functions. These include the media sense support, the NVRAM interface and the tamper detection logic. The security chip 34 supports a power-on self-test verification of tamper detection and a privileged access password that is located in the NVRAYI. The security chip 34 provides robust security compliance, while the NVRAM provides robust error logs, battery backed storage, PCI RIPL support and a lockable power-on password. The security chip 34 also supports a 2.88 MS diskette drive security command signal, as well as a flash write protect signal. The NVRAM will also contain information regarding the Micro Channel set up, as well as Micro Channel adapter POS (programmable option select) data and Micro Channel SCSI configuration data.

The embodiment of the security chip 34 is exemplary only, as other types of chips and designs can be used to provide security functions depending on the emulation desired.

The present invention has been described with respect to a specific exemplary embodiment of a riser card allowing PS/2 functions to be formed with an industry standard system board by supporting the Micro Channel interface. However, the present invention is not limited to the emulation and support of the PS/2 functions and the Micro Channel interface, but also finds utility to support other functions and different interfaces. These require, of course, different bridge chips and security and support logic chips than those used in the illustrated embodiment. The design of such chips is dependent on the specific functions that are desired to be emulated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer comprising:

a system board having an Industry Standard Architecture (ISA) bus and a peripheral controller interface (PCI) connection, and logic circuitry that support a first set of computing functions, the system board having at least one connector slot; and a riser card inserted in the at least one connector slot, said riser card having connector slots for accepting Micro Channel expansion cards and connector slots for accepting PCI expansion cards and having a riser interface that communicates with the system board through the at least one connector slot and communicates with the expansion cards through the riser card connector slots, the riser card interface including:

support circuitry mounted on said riser card including,
  a Micro Channel bus coupled to the connector slots for accepting Micro Channel expansion cards that performs with the logic circuitry of the system board a Micro Channel set of computing functions that is different from the first set of computing functions;
  a PCI bus and a Micro Channel/PCI bridge chip coupled between the Micro Channel bus and the PCI bus;
  Micro Channel support logic circuitry coupled to the Micro Channel bus including translators for translating Micro Channel bridge requests into a PCI arbiter compatible format; and
  riser card support logic circuitry including a programmable array logic circuit connected to a non-volatile RAM including Micro Channel set up data, programmable option select data and Micro Channel SCSI configuration data.

2. The computer system as defined in claim 1, further including, a cross over logic circuit coupled to the Micro Channel bus;

a Micro Channel direct memory access (DMA) controller chip coupled to the Micro Channel bus;

an electronically erasable programmable read only memory (EEPROM) controller coupled to the ISA bus; and wherein the Micro Channel support logic circuitry coupled to the Micro Channel bus further includes translators for translating an ISA DMA request into Micro Channel format, for translating a Micro Channel bus cycle into a DMA controller compatible format and for translating a DMA controller bus cycle into Micro Channel format; and the riser card support logic circuitry includes a security chip coupled to the ISA bus including a latch for detecting that a cover of the computer is open and wherein the Micro Channel set of computing functions includes security functions including media sense support, a non-volatile RAM interface and tamper detection logic.

3. A riser card, comprising:

a first connection for connecting the riser card to a system board having an Industry Standard Architecture (ISA) bus, and having a peripheral controller interface (PCI) connection and logic circuitry that supports a first set of computing functions;

a second connection for connecting the riser card to the system board for connecting PCI side band signals for processing on the riser card;

at least one third connection which includes at least one Micro Channel connector slot for connecting an adapter to the riser card; and a riser card interface that communicates with the system board through the first connection and the second connection and with the adapter through the third connection, and support circuitry mounted on said riser card that performs, with the logic circuitry of the system board, a second set of computer functions that is different from the first set of computing functions, wherein the support circuitry includes,

- a Micro Channel bus coupled to the Micro Channel connector slot;
- a Micro Channel support logic chip coupled to the Micro Channel bus; and
- a PCI bus and a Micro Channel/PCI bridge chip coupled between the Micro Channel bus and a PCI bus.

4. A riser card, comprising:

a first connection for connecting the riser card to a system board having an Industry Standard Architecture (ISA) bus and a peripheral controller interface (PCI) connection and logic circuitry that supports a first set of computing functions;

at least one second connection which includes at least one Micro Channel connector slot for connecting an adapter to the riser card; and a riser card interface that communicates with the system board through the first connection and with the adapter through the second connection, and support circuitry mounted on said riser card that performs, with the logic circuitry of the system board, a second set of computer functions that is different from the first set of computing functions, wherein the support circuitry includes,

- a Micro Channel bus coupled to the Micro Channel connector slot;
- a Micro Channel support logic chip coupled to the Micro Channel bus;
- a Micro Channel direct memory access (DMA) controller chip coupled to the Micro Channel bus;
- a PCI bus and a Micro Channel/PCI bridge chip coupled between the Micro Channel bus and a PCI bus;
- a cross over logic circuit coupled to the Micro Channel bus; and
- an electronically erasable programmable read only memory (EEPROM) controller coupled to the ISA bus.

* * * * *